United States Patent [19]

Kobayashi et al.

[11] Patent Number: 4,985,307
[45] Date of Patent: Jan. 15, 1991

[54] FLAME RETARDANT FOR WOOD AND FLAME RESISTANT WOOD

[75] Inventors: Nobuo Kobayashi, Tokyo; Hisaomi Yamamoto, Chiba; Kiyoshi Umehara, Osaka, all of Japan

[73] Assignee: Dainippon Ink and Chemicals, Inc., Tokyo, Japan

[21] Appl. No.: 263,308

[22] Filed: Oct. 27, 1988

[30] Foreign Application Priority Data

Oct. 28, 1987 [JP] Japan .................. 62-272089

[51] Int. Cl.⁵ .............. B32B 27/38; B32B 29/00; B27N 9/00; C09K 21/00
[52] U.S. Cl. .................. 428/413; 428/529; 428/537.1; 428/920; 428/921; 427/386; 427/393; 427/393.3; 252/607; 252/601; 252/606; 106/18.14; 106/18.18
[58] Field of Search ............ 428/413, 537.1, 920, 428/921, 529

[56] References Cited

U.S. PATENT DOCUMENTS 4,585,703 4/1986 Taguchi et al.
4,839,099 6/1989 Umehara et al.

Primary Examiner—P. C. Sluby
Attorney, Agent, or Firm—Armstrong, Nikaido, Marmelstein, Kubovcik & Murray

[57] ABSTRACT

There are disclosed a flame retardant for treatment of wood and a wood product coated with the flame retardent, which comprises (A) 3-(dialkylphosphono)propionamides respresented by the following general formula:

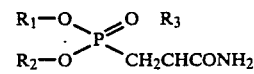

(in which $R_1$ and $R_2$ each represents an alkyl group containing 1 to 3 carbon atoms; and $R_3$ represents a hydrogen atom, a methyl group or a methylol group group) and/or methylolated derivatives thereof; (B) at least one resin selected from the group consisting of water-soluble or water-dispersible resins, melamine resins and copolycondensated urea-melamine resins; and (C) ammonium polyphosphates microcapsulated by melamine and/or epoxy resins.

3 Claims, No Drawings

FLAME RETARDANT FOR WOOD AND FLAME RESISTANT WOOD

BACKGROUND OF THE INVENTION

1. Field of the Invention

The present invention relates to a flame retardant for treatment of wood and to flame resistant wood products treated with the same.

2. Description of the Prior Art

The inventors have previously proposed a flame retardant for treatment of wood, which comprises 3-(dialkylphosphono)propionamides and melamine resins and has a pH of not higher than 3 (JP-A-62-11792, the term "JP-A" as used herein means an "unexamined published Japanese patent application").

The flame retardant not only exhibits excellent flame retarding effects but also is capable of providing remarkable weather resistance to wood. However, the prior known flame retardant has the following drawbacks:

(1) Coated films of the ratardant shows an undesirable gloss;

(2) When the ratardant is coated heavily, e.g., at a coverage of 200 g/m² (as a solid content) or more in order to attain a higher level of flame resistance, cracks are formed with the lapse of time or by outdoor exposure;

(3) In incombustibility test, a relatively long flame-remaining time is found after removal of heat source; and (4) A long curing time is required when coated heavily.

SUMMARY OF THE INVENTION

An object of the present invention is to provide a flame retardant for treatment of wood, which is capable of providing a high level of flame retardancy even when coated at a relatively low coverage, e.g., ca. 200 g/m².

Another object of the invention is to provide a flame retardant for treatment of wood which is less glossy and is substantially free from cracks.

A further object of the invention is to provide wood products treated with such a flame retardant.

According to the present invention, there is to provide a flame retardant for treatment of wood, which comprises (A) 3-(dialkylphosphono)propionamides represented by the following formula:

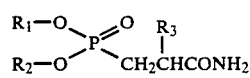
(I)

wherein $R_1$ and $R_2$ each represents alkyl group containing 1 to 3 carbon atoms; and $R_3$ represents hydrogen atom, methyl group or methylol group; and/or methylolated derivatives thereof; (B) at least one resin selected from the group consisting of water-soluble or water-dispersible urea resins, melamine resins and copolycondensated urea-melamine resins; and (C) ammonium polyphosphates microcapsulated by melamine and/or epoxy resins.

In particular, the present invention provides a flame retardant for treatment of wood, which comprises, as essential components, 100 parts by weight (as a solid content) of 3-(dialkylphosphono)propionamides represented by the following formula:

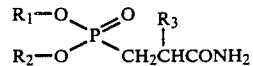

wherein $R_1$ and $R_2$ each represents alkyl group containing 1 to 3 carbon atoms; and $R_3$ represents hydrogen atom, methyl or methylol group; and/or methylolated derivatives thereof; 100 to 400 parts by weight (as a solid content) of one or more resins (hereinafter referred to as "aqueous aminoplasts") selected from the group consisting of water-soluble or water-dispersible urea resins, melamine resins and copolycondensated urea-melamine resins; and 5 to 500 parts by weight of ammonium polyphosphates microcapsulated by 10 to 500 parts by weight (as a solid content) of urea and/or epoxy resins.

The invention also provides flame resistant wood products coated thereon with said flame retardant at a coverage of at least 50 g/m² (as a solid content).

DETAILED DESCRIPTION OF THE INVENTION

Of flame retardant consisting mainly of 3-(dialkylphosphono)propionamides and aqueous aminoplasts are excessive gloss, generation of cracks and relatively long flame remaining time, and these drawbacks impair their commercial values as flame retardants for wood. The inventors have tested various additives with the purpose of rectifying the above drawbacks. However, all the additives tested showed both desirable and undesirable effects, as set forth below.

| Additives | Improvement Resulted | Deterioration Resulted |
|---|---|---|
| Ammonium phosphate | Shortening in flame remaining time | Deterioration in weatherability |
| Non-capsulated ammonium polyphosphate | Undesirable gloss; and generation of cracks | Devitrification (grain becomes unseeable through coating); deterioration in weatherability; and instability of treatment |
| Calcium carbonate | Undesirable gloss; and generation of cracks | Marked deterioration in fire resistant properties |
| Magnesium silicate | Undesirable gloss; and generation of cracks | Marked deterioration in fire resistant properties |

The flame retardant of the present invention is capable of solving all of the above problems simultaneously. The retardant is soluble in water and can be cured at room temperature, and grain of wood can be seen through the coating. It forms a highly weather resistant coatings which are substantially free from cracks. The retardant readily pass Class 3 Incombustibility according to JIS A-1321 (Japan Industrial Standard) and 30 Minute Fire Resistance Test according to JIS A-1304.

Detailed explanations will be given hereinbelow on components that constitute the flame retardant according to the invention.

(1) 3-(dialkylphosphono)propionamides

There can be used water-soluble 3-(dialkylphosphono)propionamides represented by the following formula:

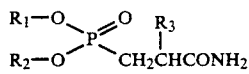

(in which $R_1$ and $R_2$ each represents alkyl group containing 1 to 3 carbon atoms; and $R_3$ represents hydrogen atom, methyl or methylol group).

As a typical example mention may be made of 3-(dimethylphosphono)propionamide (hereinafter referred to as "DMPPA"). Other examples include 3-(diethylphosphono)propionamide, 3-(di-n-propylphosphono)propionamide, 3-(diisopropylphosphono)propionamide, 3-(diisopropylphosphono)propionamide and methylolated derivatives thereof. These propionamides can be used either individually or in combination.

(2) Aqueous Aminoplasts

(i) Melamine Resins

Examples of preferable melamine resins are prepared by methylolating 1 mol of melamine with 3 to 6 mols of formaldehyde in an aqueuos medium, and include water-soluble trimethylol, tetramethylol, pentamethylol and hexamethylol derivatives of melamine resins, as well as $C_1$ to $C_3$ alkyl ether derivatives, and mixtures of these. Of these melamine resins, methyl ether derivatives (hereinafter referred to as "MMM"), in particular, partial methyl ether derivatives of hexamethylol melamine resins can be most preferable because of their capability of imparting flame retardancy with excellent weathering stability. A methylolation degree of 50% or more can be preferable with regard to preservation stability. In this case, pH of the solution just after preparing a mixture is adjusted to 3.0 or less by using hydrochloric acid, sulfuric acid, or the like, there can be obtained a flame retardant curable at ordinary temperature.

(ii) Urea Resins and Urea-Melamine Copolycondensation Products

Water-soluble or water-dispersible urea resins can be produced by methylolating 1 mol of urea with 1.0 to 2.5 mols, preferably 1.5 to 2.0 mols of formaldehyde at a pH of 4.0 to 11.0, preferably 5.0 to 9.0, at a temperature of from room temperature to 100° C., and then terminating the reaction by adding an alkaline substance to adjust pH to 7.0 to 9.0 within the limit wherein its solubility to, or dispersibility in, water can be maintained. Preservation stability of the resins can be improved by the addition of aqueous ammonia, polyvinyl alcohols, melamine, lower alkanolamines (e.g., ethanolamine) or the like in an amount up to several percents. Such urea resins may be alkylated through formation of, e.g., methyl ether groups. In general, urea-resins tend to generate cracks and liberate formalin with the lapse of time and are inferior in water resisting properties to melamine resins. It can therefore be preferable to use urea resins partially or mostly replaced and copolycondensed with melamine, namely, to obtain copolycondensation products. In such a case, formaldehyde is preferably used in an amount of from ca. 1.5 to 2.0 mols, per mol of urea, or from ca. 2.5 to 4.5 mols, per mol of melamine, and urea and melamine are preferably used in combination. A mixture of a urea resin and a copolycondensated ureamalemaine resin, as well as a mixture of these resins with a melamine resin mentioned in (i) above may also be used according to the present invention.

These aminoplasts may be low molecular precondensates showing fully water-soluble, or can be considerably methylenated half condensed products which have more or less lost solubility to water but are still capable of being freely dispersed in water. Of these aqueous aminoplasts, those incorporated with a small amount of stabilizers (for example, acidic and alkaline substances) and not subjected to etherification with alcohols (for example, methanol, isopropanol, etc.), which provide only a low level of buffering effects, can be cured at room temperature when ammonium salts having a relatively low acidity, such as ammonium chloride, ammonium (hydrogen)sulfate, ammonium (hydrogen)phosphate, etc., are added thereto in an amount not greater than 1% by weight, based on solids contained therein. However, such aminoplasts are preferably cured at an elevated temperature, for example, at 60° C. for about 20 minutes. In cases where such an ammonium salt is added thereto, the initial pH of the resulting mixture may exceed 7.0. However, its pH drops to 5.0 or less with the lapse of time, for example, after being allowed to stand for ca. 1 hour at room temperature, and its curing proceeds rapidly.

(3) Microcapsulated Ammonium Polyphosphates

Examples of preferable ammonium polyphosphates to be used in the form of microcapsules having reduced hydrophobicity include those represented by the following formulae:

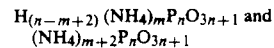

(in which n is an integer having a mean value of ca. 20 to 800; and the ratio of m to n is ca. 1) or by a simplified formula of the following:

(in which n is an integer of 800 or less) and having an average particle size of ca. 25 μm, an average molecular weight not less than 10,000, preferably not less than 50,000, a phosphorus content of 31 to 32% by weight, and a nitrogen content of 14 to 15% by weight.

Specific examples of available microcapsulated ammonium polyphosphate include the followings:

(a) Those microcapsulated by a methylolmelamine resin, such as those disclosed in JP-A-61-103962. As a typical example of such microcapsulated ammonium polyphosphates, mention may be made of EXOLIT 462 manufactured and sold by Hoechst A.G., West Germany, $((NH_4PO_3)_n, n \approx 700)$ (hereinafter referred to as "M/FMCPAP").

(b) Those microcapsulated by an epoxy resin. As an example of such microcapsules, mention may be made of EXOLIT 455 manufactured and sold by Hoechst A.G. (hereinafter referred to as "EPMCPAR").

Although there are no marked differences between the basic properties of these microcapsulated ammonium polyphosphates and those of non-capsulated ammonium polyphosphates, for example, EXOLIT 422 by Hoechst A.G. (hereinafter referred to as "PAP"), the latter contains ca. 10% by weight of water-soluble portion at 25° C., whereas the former contains ca. 1% by weight of water-soluble portion at the same temperature. That is to say, the water-soluble portion of the former is about 10 times greater than that of the latter.

In comparison with non-capsulated ammonium polyphosphates, microcapsulated, less water-soluble ammonium polyphosphates have the advantage that there can be obtained coated films having greater weathering resistance and markedly reduced liability to devitrification. Presumably, the above advantage is attributable to the fact that microcapsulated ammonium polyphosphates react chemically with aqueous aminoplasts and strongly fix thereto. The fine particles of microcapsulated ammonium polyphosphates also have the function as a reinforcing agent for preventing the generation of cracks in the flame retarding films. There is a tendency that when a dispersion of microcapsulated ammonium phosphates is contained in a container, there occurs dilatancy because of its high specific gravity. However, if 3-(dimethylphosphono)propionamide or its methylolated derivative is mixed therewith, the above defect can be rectified or its re-dispersion can be made easier.

An example for mixing the essential components of the invention will be described hereinbelow.

One hundred (100) parts by weight (as a solid content) of 3-(dialkylphosphono)propionamides (e.g., 3-(dimethylphosphono)propionamide (DMPPA)) and/or methylolation products thereof is admixed with 100 to 400 parts by weight, preferably 150 to 250 parts by weight based on weight of aqueous aminoplasts, and 5 to 500 parts by weight of microcapsulated ammonium polyphosphates. The aqueous mixture is used in a state having a pH not higher than 5.0, preferably not higher than 4.0 which is measured 1 hour after the addition of curing accelerator. The solid content of the aqueous mixture is preferably 20 to 80% by weight, more preferably 40 to 70%. In order to make sure that the mixture can be cured completely even at ordinary temperature, pH of the mixture must be adjusted to 5.0 or less. For this purpose, an acidic catalyst is added thereto as a curing accelerator. In cases where a melamine resin, which exhibits a strong buffering effect in DMPPA and aqueous aminoplasts, is used in the formulation of the present invention, curing proceeds through condensation eliminating water and methanol, and hence curing reaction does not proceed smoothly if water and methanol generated during curing do not go out of the curing system. In the case of a thick coating, e.g., a coating with a solid coverage of 200 g/m² or more, a strong inorganic acid, such as hydrochloric acid, sulfuric acid, etc., may preferably be used in such an amount that the pH of the aqueous mixture can be lowered to 3.0 or less in order to secure a rapid curing. In the case of a relatively thin coating, e.g., a coating having a solid coverage of ca. 100 g/m², curing can proceed quite efficiently if pH is adjusted to not higher than 5.0, preferably not higher than 4.0, by using an acid, such as phosphoric acid, sulfamic acid, p-toluenesulfonic acid, p-toluenesulfamic acid, etc., or by using an acid weaker than these. If the initial pH exceeds 5.0, the condensation between DMPPA and MMM does not proceed smoothly at room temperature, and hence the coated film formed therefrom will not become completely insoluble to water within a short period of time. However, in cases where a urea resin or a copolycondensated urea-melamine resin, which exhibits a relatively low buffering effect in aqueous aminoplasts, is used, ammonium (hydrogen)sulfate, ammonium chloride, or the like is preferably used. In such cases, initial pH may exceed 5.0, however, the pH should drop to 5.0 or lower, preferably 4.0 or lower, within 1 hour after the addition of the acids.

In addition to the above-described indispensable components, the flame retardant of the invention may be additionally incorporated with a variety of additives, including those described hereinbelow:

1) Dispersant

A dispersant or emulsifier in the fire retarding formulation of the invention may be preferably used, so as to allow the microcapsulated ammonium polyphosphates to be suspended stably. Since the fire retarding coating solution is used at a pH not higher than 5.0, or in some cases at a pH as low as ca. 2.0, a dispersant which can be stable under such acidic conditions is necessarily used. Nonionic surface active agents having a relatively large molecular weight can be a preferable dispersant because of their capability of providing a good dispersibility and a reduced tendency to dilatancy. Examples of such surface active agents include Pluronic-type block polymers of ethylene oxide (EO) or propylene oxide (PO); products prepared by adding EO and PO in the mixed or blocked state to alkylphenols, e.g., Discol R by Dai-ichi Kogyo Seiyaku Co., Ltd.; products prepared by adding EO and PO in the mixed or blocked state to a polychain product of alkylamides and ethyleneimine, e.g., Discol AN and Discol N by Dai-ichi Kogyo Seiyaku Co., Ltd.; and condensation products of sodium naphthalenesulfonate with formalin. Other surface active agents, as well as watersoluble polymers compatible with melamine resins, for example, hydroxy celluloses may also be available according to the present invention. Satisfactory results can be obtained by using these surface active agents in an amount of from 1 to 10% by weight, preferably from 3 to 5% by weight, based on the weight of the microcapsulated ammonium polyphosphates.

2) Alcohols Having 1 to 3 Carbon Atoms

The following advantages can be attained by replacing a part of water contained in the coating formulation of the invention with methanol, ethanol, (iso)propanol, or a mixture thereof.

a) Prolongation of gelling time, namely, prolongation of shelf life of the treating solution;

b) Improved penetability into the wood; and c) Acceleration of drying and curing after being coated.

3) Antifoaminq Agent

A beautiful surface can be attained by the addition of a silicon type antifoaming agent, octyl alcohol, Nopco NDW sold by Diamond Shanok Inc., or the like, in an amount of ca. 1 g/liter.

4) Penetrant

Amphoteric surface active agents, in particular, fluorocarbon surfactants, e.g., Megafac F 833, can be useful as a penetrating agent. Low viscosity, rewettable nonionic surfactants capable of maintaining its capability as a surface active agent may also be used at a low pH.

The flame retardant of the invention can be applied to the surface of wood by means of, e.g., flow coater, overflow coater, spray gun, hand roll coater, brush, etc., or by dipping wood into the treating solution. The flame retardant of the invention can be applied at a coverage of 50 g/m$^2$ (as a solid content) or more, preferably from 150 to 250 g/m$^2$, per one surface of wood products. The flame retardant preferably has a solid concentration of about 60% by weight. If the concentration is higher than 70%, there may be resulted an insufficient fluidity, and hence it becomes difficult to form a uniformly coated surface. If the concentration is less than 50%, an excessive penetability may be resulted. In this case, if the flame retardant is applied, e.g., to a thin wood board of radial cut, an excessive amount of coating solution penetrates into the wood, and therefore it becomes impossible to form an intumescent insulating layer having a sufficient thickness, thus resulting in lowering in flame retarding effects.

In cases where a flame retarding coating according to the formulation of the invention is applied to wood which has been dried excessively, e.g., to a moisture content of 5% or less and rendered excessively porous by prolonged outdoor exposure, the surface of the wood may be moistened, e.g., by spraying or brushing water thereon, so as to prevent excessive penetration of the flame retardant and lowering in flame retarding effects. Before being coated with the flame retardant, the thus treated wood is preferably allowed to stand for a while, thereby allowing water to penetrate and diffuse uniformly into the wood. The desired flame retarding effects can be attained by applying the flame retardant in a relatively small quantity, e.g., 150 g/m$^2$ or less. On the other hand, in cases where the flame retardant is coated on a wood containing excessive moisture, the coated film of the ratardant may peel off or runs thereof may be formed. The retardant may therefore be preferably coated onto a wood having a moisture content of 8 to 30%. If the moistening treatment before application of the retardant is carried out properly, warping of wood can be prevented. If the surface of wood is treated with an aqueous 1 to 2% solution of surface active agents and then dried before being coated with the flame retardant, its penetability into the wood can be improved markedly. Although various penetrants can be used for the above purpose, amphoteric fluorocarbon surfactants, e.g., Megafac by Dainippon Ink & Chemicals, Inc. can be particularly suitable. Other suitable examples include nonionic surface active agents which are capable of withstanding low pH condition, exhibit rewettability and possess low viscosity in dried state.

The flame retarding formulation of the present invention can be utilized in a wide variety of fields. The flame retardant can be applied to almost all wood products that require both weather resistant and flame retarding properties. Examples of wood products to which the formulation of the invention can be applied include those to be used outdoors and those which may come into contact with water, for example, thin or thick boards for roofing of, e.g., pine or cryptomeria, frames for windows, doors, stairs, walls, eaves, fences, lattices, stepladders, wall covers, exterior ornaments, cross bars for fences, wooden houses, poles, interior wood materials for yachts, ships, baths, etc., sheds for livestock, closets of, e.g., Japanese-style houses, timbering in mines, wooden boxes for transportation, shrine and temple buildings, and the like. It is a matter of course that the flame retardant of the invention can also be applied effectively to wood products to be used indoors, such as structural plywoods, ceiling boards, flooring boards, under floor boards, cross bars for roofs, grids for screens, indoor doors, pillars, and the like. There is no particular limitation on the kind of wood to which the retardant of the invention can be applied, and almost all kinds of woods can be rendered resistant to fire quite effectively.

The present invention will further be illustrated by way of examples. It would, however, be understood that the invention is by no means limited thereto. In the following examples, all the parts and percents are based on weight unless otherwise specifically stated.

EXAMPLES 1-4 AND COMPARATIVE EXAMPLES 1-2

A plywood having a moisture content of 10.2% and a thickness of 4 mm and consisting of a core (thickness: 2 mm) of lauan and front and back layers (thickness: ca. 1 mm each) of linden was coated with flame retarding formulations shown in Table 1 and tested in accordance with the method prescribed in Japan Industrial Standard (JIS) K 5661-1970 (Fire-Retardant Paints for Buildings), whereby the fire retardants were coated in quantities shown in the table.

TABLE 1

|  | Comparative Example 1 | Comparative Example 2 | Example 1 | Example 2 | Example 3 | Example 4 | Example 5 |
|---|---|---|---|---|---|---|---|
| Formulation of Flame Retardant | | | | | | | |
| Aqueous 70% Solution of DMPPA | 270*[1] | 270*[1] | 255*[1] | 223*[1] | 223*[1] | 207*[1] | 207*[1] |
| Aqueous 70% Solution of Methyl Ether Derivative of Pentamethylolmelamine | 550 | 550 | 518 | 466 | 466 | 423 | 423 |
| Aqueous 11% Hydrogen Chloride Solution (containing 7% of methanol) | 170 | 170 | 160 | 151 | 151 | 130 | 130 |
| Fine Powders of Ammonium Polyphosphate Capsulated by Melamine Resin (EXOLIT 462) | — | — | 57 | 150 | 150 | 230 | 230 |
| Fluorocarbon Activator | 10 | 10 | 10 | 10 | 10 | 10 | 10 |
| Solid Content (approximate calculation) | 60% | 60% | 62% | 65% | 65% | 69% | 69% |
| Phosphorus Contained in the Treating Solution | 3.2% | 3.2% | 4.8% | 7.3% | 7.3% | 9.6% | 9.6% |
| Amount Coated (g/m$^2$) (solids) | 171 | 287 | 285 | 157 | 295 | 174 | 295 |
| Appearance | | | | | | | |
| Transparency | Good | Good | Good | Good | Good | Good | Slightly |

TABLE 1-continued

| | | | | | | | devitrified |
|---|---|---|---|---|---|---|---|
| Gloss | Strong Formed | Strong Formed | Small None | None None | None None | None None | None None |
| Cracks 2 Months after Coating | | | | | | | |
| Incombustibility Test*[2] | | | | | | | |
| $T_c$(min., sec.)*[3] | 3'30" | 3'34" | 3'28" | 4'38" | More than 6 min. | 5'23" | More than 6 min. |
| $Td\theta$ (°C., min.)*[4] | 310 | 314 | 207 | 53 | — | 9 | — |
| CA*[5] | 108 | 62 | 77 | 34 | 24 | 22 | 17.4 |
| Flame Remainint Time (sec.) | 152 | 54 | 28 | 24 | 20 | 19 | 0 |
| Cracks*[6] | None | None | None | None | None | None | None |
| Deformation*[7] | None | None | None | None | None | None | None |
| Decrease in Weight (%) (reference item) | 26.1 | 19.4 | 17.4 | 15.6 | 9.0 | 12.0 | 7.0 |

Notes:
*[1] g/1,000 g
*[2] According to Grade 3 Incombustibility Test of JIS A-1321
*[3] Period time where the exhaust temperature under heating exceeded the standard temperature curve
*[4] Temperature × time × area where the exhaust temperature curve exceeded beyond the standard temperature curve
*[5] Coefficient of fuming (amount of fuming per unit area)
*[6] Generation of cracks reaching the wood
*[7] Deformation detrimental to the prevention of fire Examples 5–6 and Comparative Example 3

| | |
|---|---|
| (1) Aqueous 70% 3-(dimethylphosphono)-propionamide solution | 220 g |
| (2) methyl ether derivative of hexamethylolmelamine | 460 g |
| Ammonium polyphosphate microcapsulated by epoxy resin (EXOLIT 455) | 150 g |
| (3) Block polymer of ethylene oxide and propylene oxide (Pluronic L-84) | 8 g |
| (4) Fluorocarbon penetrant (Megafac F 833) | 10 g |
| (5) p-Toluenesulfonic acid | 3 g |
| Water | 149 g |
| Total | 1,000 g |

The above component (3) was diluted with 100 ml of water and then admixed with component (1). Component (2) was added to the mixture and thoroughly mixed by a mixer, and the resulting mixture was mixed with the rest of the above components.

The thus-obtained treating solution was coated onto the surface of cryptomeria boards (thickness: 6 mm) at a coverage of 160 g/m² (coverage of solids: 102 g/m²) (Example 5) or at a coverage of 300 g/m² (coverage of solids: 192 g/m²) (Example 6), and the coated boards were allowed to stand for 24 hours, so as to cure the coated films at ordinary temperature. The thus-formed films of the flame retardant were transparent and showed no disagreeable gloss. No cracks were generated even after 3 months at ordinary temperature. The samples were subjected to the Accelerated Weathering Test (100 hours) according to §6.17 of JIS K 5400-1979, and the yield (remaining rate) of phosphorus in the coatings were determined. The cryptomeria boards and an untreated cryptomeria board (Comparative Example 3) were subjected to the Grade 3 Incombustibility Test according to JIS A 1321. The results obtained are shown in Table 2. Abbreviations used in the table have the same means as those used in Table 1.

TABLE 2

| | Example 5 | Example 6 | Comparative Example 3 |
|---|---|---|---|
| Yield of Phosphorus upon Weathering | | | |
| Phosphorus Content before Weathering (g/m²) | 11.5 | 21.4 | — |
| Phosphorus Content after Weathering (g/m²) | 9.9 | 19.6 | — |
| Yield (%) | 86 | 92 | |
| Incombustibility Test | | | |
| Tc (min., sec.) | 4'50" | More than 6 min. | 2'40" |
| $Td\theta$ (°C., min.) | 35 | 10 | 505 |
| CA | 31 | 21 | 75 |
| Flame Remaining Time (sec.) | 15 | 11 | More than 3 min. |
| Cracks | None | None | None |
| Deformation Detrimental to Prevention of Fire | None | None | None |
| Decrease in Weight (%) | 14.4 | 7.1 | 33.0 |

The content of phosphorus was determined as follows: A strip of 1×2 cm having a thickness of ca. 1 mm and containing both wood and coated film was cut off with a chisel from the coated surface of each sample. The strip was completely decomposed with concentrated sulfuric acid and perchloric acid, and its phosphorus content was measured by the conventional vanado-molybdenate colorimetry, using as a standard a solution of phosphoric acid of a known concentration. This procedure was repeated 5 times for one sample, and their average was determined. Yield of phosphorus in Table 2 was calculated therefrom in accordance with the following formula:

$$\text{Yield (\%)} = \frac{\text{Phosphorus content after weathering}}{\text{Phosphorus content before weathering}} \times 100$$

EXAMPLE 7

In a mixer were uniformly admixed 6 kg of a urea resin (adhesive for plywood) having a methylolation degree of 1.7 and a concentration of 58%, the pH of which had been adjusted, after preparation, to 8.0 for the purpose of stabilization; 3.8 kg of a mixture prepared by admixing 60 parts of 70% DMPPA, 36 parts of EX-OLIT 462 and 4 parts of aqueous 4% hydroxyethyl cellulose solution in a dispersion mixer at 3,000 rpm for ca. 5 minutes; and a solution of 50 g of ammonium sulfate in 0.2 kg of water (total amount: 10 kg). The pH of the resulting mixture was 7.3 just after the admixture, but it dropped to 3.3 in 1 hour. The mixture was stable for about 5 hours at 20° C. after the admixture. The mixture was coated by a flow-coater onto a 5-ply lauan plywood having a thickness of 9 mm and a moisture content of 12.3%, to give a solid coverage of 200 g/m². After being dried at 66° C. for 15 minutes, part of the plywood was subjected to 3rd Grade Water Immersion Test for Decorative Plywood according to Japanese Agricultural Standard (2 hours immersion at 35° C. and 3 hours drying at 60° C.). Flame retarding properties of the coatings before and after the immersion were compared in accordance with the 3rd Grade Incombustibility Test of JIS A-1321. The results obtained (average of three tests) were as shown in Table 3.

TABLE 3

| | Before Immersion | After Immersion | Acceptance Requirement |
|---|---|---|---|
| Period of time where the exhaust temperature exceeded the standard curve (Tc) | 5'48" | 5'20" | Less than 6 min. |
| Temperature × time × area where the exhaust exceeded the standard curve (°C. × min; Tdθ) | 15 | 40 | Less than 350 |
| Amount of fuming per unit area (CA) | 20 | 22 | Less than 120 |
| Flame remaining time (sec.) | 13 | 26 | Less than 30 sec. |
| Deformation detrimental to the prevention of fire | None | None | None |
| Judgement | Accepted | Accepted | |

EXAMPLE 8

The procedure of Example 7 was repeated in the same manner, except that an aqueous dispersion of urea-melamine copolycondensation product prepared by reacting 2.4 parts by mol of formaldehyde with 1 part by mol of equimolar mixture of urea and melamine and then adjusting pH to 8.0, followed by dilution with water up to a concentration of 58% was used, in place of the urea resin. This aqueous dispersion has been widely used as an adhesive for water-resistant plywoods. The coated plywood was subjected to 3rd Grade Water Immersion Test according t JAS (2 hours immersion at 70° C. and 3 hours of drying at 60° C.). This test was repeated 3 times and the average values were obtained and shown in Table 4 below.

TABLE 4

| | Before Immersion | After Immersion | Acceptance Requirement |
|---|---|---|---|
| Tc (min., sec.) | More than 6 min. | 5'05" | Less than 6 |
| Tdθ (°C. × min.) | 0 | 20 | Less than 350 |
| CA | 15 | 30 | Less than 120 |
| Flame remaining time (sec.) | 9 | 22 | Less than 30 |
| Deformation | None | None | None |
| Judgement | Accepted | Accepted | |

Remarks: Tc, Tdθ, CA and Deformation are as defined in Table 3.

The treating solution prepared in this example had a pH of 7.8 just after the admixture, and its pH dropped to 4.0 in 1 hour. The pH of the solution continued to drop, and became insoluble to water after being allowed to stand for 4 hours at 20° C.

EXAMPLE 8 AND COMPARATIVE EXAMPLE 4

A coating solution was prepared in the same manner as in Example 7, except that N-methylol-3-(dimethylphosphono)propionamide was used instead of DMPPA. This coating solution was coated at a solid coverage of 200 g/m² onto a particle board (specific) gravity: 0.7; thickness: 30 mm; size: 90×180 cm) produced by bonding lauan tips with a urea resin and was cured at ordinary temperature (20°±5° C.) for 2 hours. Thermometers were fitted at 9 places on the back surface of the coated board and a non-coated board. The boards were subjected to the Incombustibility Test according to JIS A 1304, and the period of time passed until the temperature of their back surfaces reached at 260° C. was determined. In the case of the coated board, it was 63 minutes and 20 seconds, whereas it was 23 minutes and 15 seconds in the case of the non-coated board.

While the invention has been described in detail and with reference to specific embodiments thereof, it will be apparent to one skilled in the art that various changes and modifications can be made therein without departing from the spirit and scope thereof.

What is claimed is:

1. A flame resistant wood product coated with a flame retardant composition which comprises at least one compound selected from 3-(dialkylphosphono)propionamides and methylolated derivatives thereof represented by the following general formula:

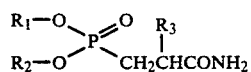 (I)

wherein $R_1$ and $R_2$ each represents an alkyl group containing 1 to 3 carbon atoms; and $R_3$ represents a hydrogen atom, a methyl group or a methylol group; at least one resin selected from the group consisting of water-soluble or water-dispersible resins, melamines and copolycondensated urea melamine resins; and ammonium polyphosphates microcapsulated by melamine or epoxy resins.

2. A flame retardant wood product as claimed in claim 1, wherein said retardant composition is coated on the surface of the wood product at a coverage of at least 50 g/m$^2$.

3. A flame retardant wood product as claimed in claim 1, wherein said retardant composition has a solids concentration of about 60% by weight.

* * * * *